Feb. 10, 1931.  O. M. BULLOCK  1,791,710
TOOL
Filed Dec. 28, 1927
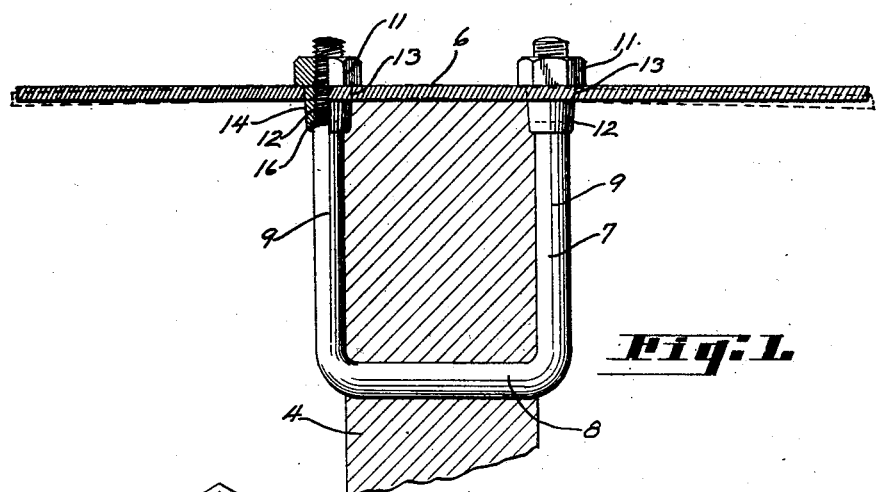
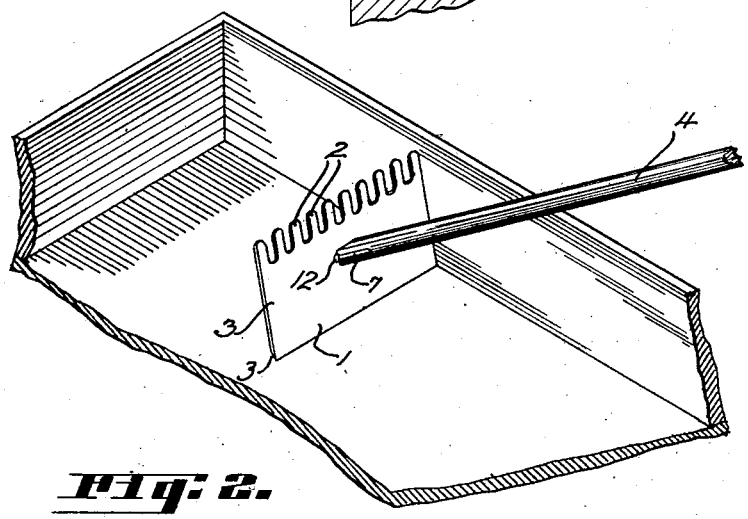
ORIN M. BULLOCK.
INVENTOR
BY
ATTORNEY Patented Feb. 10, 1931

1,791,710

UNITED STATES PATENT OFFICE

ORIN M. BULLOCK, OF OAKLAND, CALIFORNIA

TOOL

Application filed December 28, 1927. Serial No. 243,043.

The invention relates to improvements in tools and has particular reference to a mortar mixer in which a rectangular blade has a handle extending from the center thereof and in which one edge of the blade is provided with teeth, while the other edges are preferably sharp so that when the blade is drawn thru the mortar in a rectangular box, the bottom edge of the blade will scrape the bottom of the box, while one of the side edges of the blade scrapes the side of the box, and the top edge agitates the mortar by forcing the same to pass between the teeth. My tool is also intended for a combination garden tool, and when used as such, one edge may be used as a rake, the opposite edge as a weed cutter, and the side edges for a hoe.

It is further proposed in the present invention to provide a tool, presenting all the advantages outlined above, that is very simple, and that is made of a single blade of spring steel which is fastened to a handle by placing the blade against the end of the handle, anchoring a U bolt in the handle in such a manner that the legs of the U bolt pass thru the blade and by securing the blade by means of nuts threaded on the end of the U bolt.

It is further proposed to provide certain improvements in connection with the nut which protect the thread of the U from injury thru lateral shifting of the blades.

Further objects and advantages of my device will appear as the specification proceeds.

The preferred form of my invention is illustrated in the accompanying drawing, in which:

Figure 1 shows a longitudinal section thru the fastening means for the blade, and Figure 2 illustrates, in perspective view, the use of my tool in connection with a mortar mixing box.

While I have shown only the preferred form of the invention, it should be understood that various changes may be made within the scope of the claims hereto attached, without departing from the spirit of the invention.

In its preferred form, my tool comprises a flat blade 1, rectangular in form, and provided with a plurality of teeth 2 in one of the long edges thereof, while the three other edges are preferably beveled, as shown at 3. This blade is preferably made of spring steel. The handle 4 may be of any suitable kind and preferably terminates in a flat end face, adapted to be placed against the blade. A U bolt 7 has its base 8 embedded in the handle at a distance from the blade and has its legs 9 extending alongside of and parallel to the handle and thru registering holes in the blade. Nuts 11 are threaded on the end of the legs of the U bolt and bear on the outer face of the blade for holding the same in place.

In order to protect the thread from the blade, and to firmly hold the latter against lateral shifting, I provide sleeves 12 extending from the nut thru the holes in the blade, and these sleeves are preferably tapered as shown at 14, so that they wedge themselves into the blade as the nut is tightened upon the same. I also preferably hollow the extreme ends of the sleeves, as shown at 16, to facilitate slight bending of the legs of the U bolt in case it is desired to attach the blade to the handle at a slight angle. This hollowing out of the extreme ends of sleeves also facilitates the starting of the same on the threads of the U bolt.

It will be noted that my tool is exceedingly simple in construction, while at the same time the blade is fastened to the handle in a very substantial manner. My tool is extremely useful for many purposes, and aside from making a splendid mortar mixer, it may be used as a garden tool where it serves the purposes of a rake, a hoe, and a scraper or weed cutter, and I also find that the features combined in this tool make the same exceedingly well adapted for a fire fighting tool. The particular shape of the nut prevents the blade from cutting into the thread of the U bolt and substantially aids in prolonging the life of the tool.

I claim:—

1. In a tool of the character described, means for securing a blade to the end of a handle comprising a shank anchored in the handle and extending through a hole in the blade, a nut threaded on the shank and bearing on the blade and a sleeve extending from the nut through a hole in the blade for protecting the thread on the shank against the blade, the extremities of the sleeve being hollow to allow of slight bending of the shank.

2. In a tool of the character described, means for securing a blade to the end of a handle comprising a shank anchored in the handle and extending through a hole in the blade, a nut threaded on the shank, and a sleeve continuous with the nut extending through the hole in the blade for protecting the thread on the shank against the blade, said sleeve being hollow to allow of slight bending of the shank.

In testimony whereof I have affixed my signature.

ORIN M. BULLOCK.